Patented Sept. 3, 1940

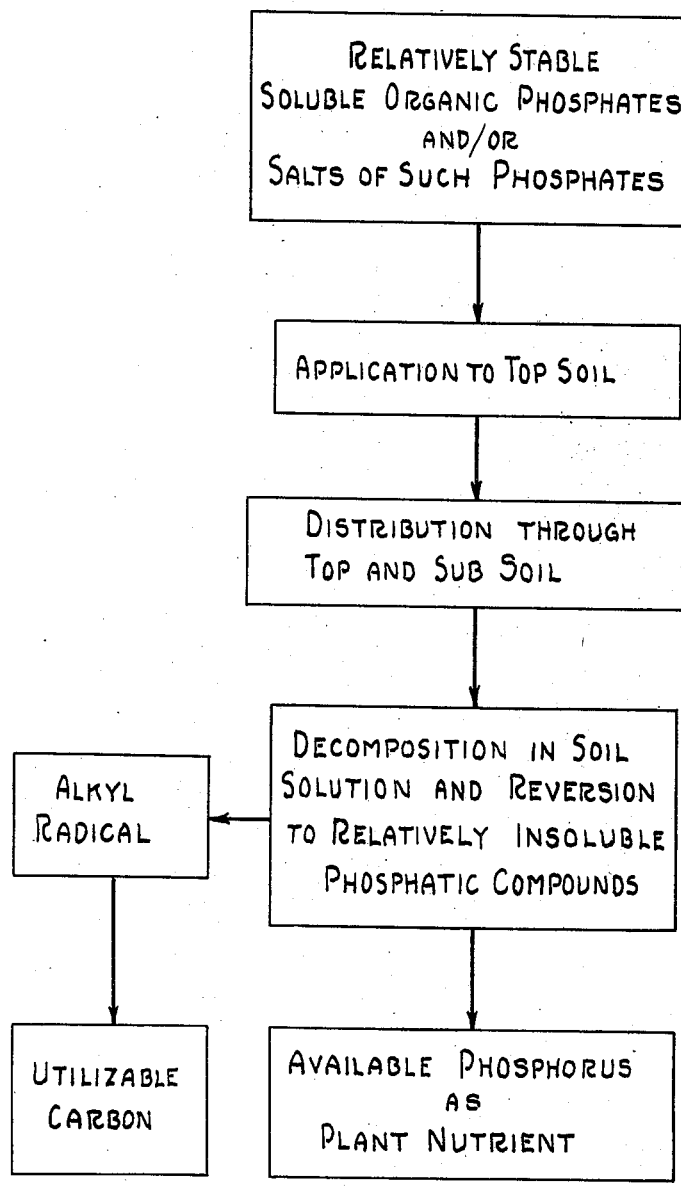

2,213,514

UNITED STATES PATENT OFFICE 2,213,514

METHOD OF SOIL FERTILIZATION

Wilder D. Bancroft, James K. Wilson, and John E. Rutzler, Jr., Ithaca, N. Y.

Application October 21, 1937, Serial No. 170,288

2 Claims. (Cl. 47—58)

Our invention relates to the use of organic phosphates, as fertilizing materials, and more particularly to those soluble organic phosphate compounds which are relatively stable when in contact with the solutions present in various soils. This application is a continuation in part of our co-pending application Serial No. 119,680, filed January 8, 1937.

Phosphatic compounds may be divided roughly into two types, depending upon their solubilities and stability when applied to the soil. The members of one of these groups, which includes superphosphate, when applied to the soil, undergo at once what is called "reversion" or "fixation;" that is, they become modified to an insoluble condition as soon as they come into contact with the soil solution. An especially rapid reversion takes place when these phosphates are brought into contact with soluble salts of calcium, magnesium, aluminum or iron.

As a result of this reversion the phosphorus in these compounds becomes water-insoluble and therefore unavailable as a plant food before it reaches a lower layer of the soil. It is well known that most of the roots of the plant are situated in this lower layer and therefore a greater part of the phosphorus applied to the soil, in the form of various so-called available phosphates, is never actually available to the growing plant.

On the other hand the second group of organic phosphates, which includes such compounds as calcium glucose phosphate and calcium mannose phosphate, are so soluble that they are washed by rains through both the top-soil and the layer, which contains the roots of the growing plants, into the sub-soil where they are of less assistance to the plant. It should be noted also that that portion of these compounds that does reach the root area of the plant appears to be so stable that it remains soluble and may be washed away by the rains and as a result will not satisfy the phosphorus requirements of the second crop on the same land.

It can readily be seen that because of the rapid reversion of available phosphates, which compose the unstable first group, into an insoluble form and because of the rapid diffusion of the more soluble and stable compounds in group two that it is impossible to distribute these compounds in an available form in the plant root area where their action will be most efficient. Agronomists therefore obtain a benefit from only a small part of the phosphatic compounds which they distribute in the soil and for this reason have to use a much greater quantity of these materials, that furnish phosphorus, than would be necessary if a proper diffusion could be obtained.

One of the objects of our invention is to provide a fertilizing material which will overcome these difficulties.

Another object of our invention is to provide a method of distributing plant food in an available form throughout the layer of soil containing the roots of the growing plants.

Yet another object of our invention is to provide a phosphatic material which will not react rapidly in contact with the top layer of the soil and will therefore be diffused into the soil while still in soluble form.

Yet another object of our invention is to provide a phosphatic material, for use as a fertilizer, which will be diffused into the soil before it is hydrolyzed.

Still another object of our invention is to provide a phosphatic material, for use as a fertilizer, which will hydrolyze to form a relatively insoluble, but nevertheless available, compound after it has diffused through the top layer of the soil but before it reaches an area below the roots of the growing plants.

Yet another object of our invention is to provide a phosphatic material, for use as a fertilizer, the phosphorus content of which upon decomposition of the material will be readily available for plant use.

Still another object of our invention is to provide a phosphatic material, for use as a fertilizer, which upon decomposition will furnish carbon in a form which can be utilized by bacteria and growing plants.

Yet another object of our invention is to provide a phosphatic material containing ammonia, for use as a fertilizer, which upon decomposition will not have an acidifying effect upon the soil.

Still another object of our invention is to provide a phosphatic material for use as a fertilizer which, owing to its relative stability during diffusion in the soil, may be used effectively in smaller amounts.

Yet another object of our invention is to provide a phosphatic material, for use as a fertilizer, which will diffuse well, but after decomposition remains in the plant root area of the soil for several years in available form.

Yet another object of our invention is to provide a phosphatic material, for use as a fertilizer, which after decomposition can be completely utilized as plant nutriment thereby introducing no extraneous material into the soil.

Yet another object of our invention is to provide a metallic salt of a phosphatic material containing metals that can be readily utilized by the growing plant.

Another object of our invention is to provide a phosphatic material, for use as a fertilizer, the particles, of which, upon decomposition in the soil, and subsequent reaction with the soil solution, do not tend to increase in size, due to the resultant uniform distribution throughout the soil.

The single sheet of drawings shows a diagrammatic representation of our invention.

Our invention consists in applying, in any suitable manner, certain soluble organic phosphates or their salts and/or mixtures thereof to the surface or sub-surface of the soil that is to be fertilized. The nature of these compounds will be described more fully hereafter but they were chosen for their relative stability, as compared to superphosphate for instance, when first applied to the soil which enables them, due to the fact that they are soluble, to permeate into the soil layer containing the roots of the growing plants.

These compounds were further selected because we have found that they are not stable to such a degree as to remain soluble until washed so deeply into the soil, by rains, as to lose to a considerable degree their availability to the plant roots.

Another valuable feature of these compounds consists in the fact that during and after diffusion into the soil the alkyl radicals, which they contain, split off and the carbon therein becomes available to the soil micro-organisms and crop plants. The uniform distribution of the particles of the inorganic phosphates, which results from these processes, increases their availability for future crops over that obtained from superphosphate, for example.

Our invention also includes the use of metallic salts of these organic phosphates especially metallic salts such as potassium, iron and magnesium alkyl phosphates the metallic constituents of which are beneficial to growing plants. Organic phosphatic compounds containing ammonia may also be used and it is to be noted that these compounds are completely available to the plant without leaving an acid residue in the soil.

We have found by the use of soluble, relatively stable organic phosphates such as mono-, di-, or trimethyl phosphate; mono-, di-, or triethyl phosphate; mono-, di, or tripropyl phosphate; and to somewhat less advantage, mono-, di-, or tributyl phosphate, that a fertilizing material having the desirable properties mentioned above is obtained.

Alternatively, we may prefer to use monomethyl dicalcium phosphate or dimethyl monocalcium phosphate or monoethyl dicalcium phosphate or diethyl monocalcium phosphate or the corresponding propyl or butyl compounds of phosphoric acid or the corresponding derivatives of metaphosphoric acid, or any combination of these, or any combination of these with any combination of the above mentioned organic phosphates which do not contain calcium. It is understood throughout this application that when we use the term "phosphoric acid" or "phosphate" we intend to include all the acids of phosphorus including the ortho, meta or pyro.

Instead of these alkyl phosphates and their calcium salts we may prefer to use, for instance, the iron, aluminum, magnesium, sodium or potassium salts of said phosphates or some combination thereof. By replacing the hydrogen atom or atoms in the mono-, or dialkyl phosphate with any of the above mentioned elements or the ammonium radical we introduce an essential plant nutrient into the compound all the component parts of which may be utilized by the plant. The acidity of the soil is thereby not increased as it is in the use of ammonium sulphate or potassium chloride, for example.

Instead of the above organic phosphates isopropyl or isobutyl phosphate and their salts or mixtures thereof or allyl vinyl, or propargyl phosphates or their salts may be used.

There are many known general methods, some of which we have employed, for the preparation of these compounds and their salts. Two general methods will be given by way of example. In the following equations R refers to the alkyl radicals mentioned above.

1. $3ROH + P_2O_5 \rightarrow R_2HPO_4 + RH_2PO_4$
$RH_2PO_4 + Ca(OH)_2 \rightarrow CaRPO_4 + 2H_2O$
2. $ROH + H_3PO_4 \rightarrow RH_2PO_4 + H_2O$
3. $2ROH + H_3PO_4 \rightarrow R_2HPO_4 + 2H_2O$
4. $ROH + HPO_3 \rightarrow RPO_3 + H_2O$ Equation 4 is for the preparation of an alkyl metaphosphate. Clearly, it is necessary to remove the water nearly as fast as it is formed in using methods 2, 3 and 4 in order to obtain reasonably high yields of organic phosphate. There are well-known methods of accomplishing this.

A particular characteristic of all these organic phosphates, which form a part of our invention, is that when hydrolyzed they yield alcohols which contain only one hydroxyl group. Likewise, in every case the final compound has from one to three hydroxyl groups less than the phosphoric acid from which it is derived.

Our organic phosphates do not derive solubility, as do calcium mannose phosphate or calcium glucose phosphate for example, from the introduction into the phosphoric acid molecule of hydroxyl groups attached to a carbon atom or atoms of the organic compound from which they are formed. In fact, the stability of the several organic phosphates in contact with the soil and its solution is of much greater importance in the operation of this invention than the solubility of said organic phosphates so long as they are at least slightly water soluble to begin with. The stability of these compounds in contact with the soil and its solution results in a more or less uniform, wide and deep distribution through the soil.

The behavior in contact with the soil and its solution and toward plants, of the organic phosphates used to carry out our invention, is unique and unexpected in at least two respects. In the first place they are neither so soluble in the soil solution that they tend to wash out of the soil, or to soil horizons well below the roots of crop plants, nor so insoluble as to hinder their wide and deep distribution through the soil. The solubility of the calcium diethyl phosphate, for example, is of the same order as that of the monocalcium phosphate in superphosphate but very much less than that, for example, of calcium glucose phosphate or calcium mannose phosphate. It is necessary to consider only the salts of the organic phosphates because when such compounds as, for instance, unneutralized glucose phosphate or diethyl phosphate are put on the soil in actual agricultural practice they are neutralized very quickly by the cations in the soil solution to form, for example, calcium, magnesium or iron glucose or ethyl phosphate. Thus, in contrast to other phosphatic fertilizer materials, the solubilities of our organic phosphates in the soil solution are in the region between too insoluble to penetrate and diffuse well and so soluble that a loss of fertilizer material results from washing out of the area occupied by the roots of crop plants. The second unique and unexpected behavior of the organic phosphates is toward the plant. We have found experimentally that our compounds are not utilized readily as such by a large number of plants but that the plants utilize the phosphorus in the decomposition products after the alkyl radical is split off in the soil solution. This behavior forms the basis for a co-pending application.

The phosphorus in such compounds as superphosphate, "ammophos" and calcium sorbitol phosphate is considered currently to be available as a plant nutrient either directly or after ionization of the compounds in the soil solution in contra-distinction to the phosphorus in our organic phosphates which becomes most available after removal of the alkyl radical in the soil solution. The organic phosphates used to carry out our invention are not so stable in the soil that the alkyl group fails to split off. On the other hand, depending upon the soil, it seems to require from two to six weeks for the above-mentioned decomposition to approach completeness; consequently there is more than ample time for them to become well distributed through the soil prior to complete decomposition and the final process of fixation in the soil in a much more insoluble form.

At this point it is well to present the comparative pictures of the soil profile let us say a month or so after the application to the soil of superphosphate or "ammophos" in contradistinction to our organic phosphates and in comparison with compounds such as calcium mannose phosphate. Superphosphate and "ammophos" very rapidly revert to relatively insoluble phosphorus compounds after addition to the soil. As a result the particles of the relatively insoluble phosphorus compounds, the reverted phosphate, are found in large numbers in the top few inches of the soil; as we go below the top few inches the numbers of reverted phosphate particles decrease extremely rapidly with increasing depth. So the distribution through the soil is poor. At the same time, the conditions for the formation of larger crystals of the reverted phosphate from the smaller ones are fairly good in the top few inches of the soil where the number of particles is large.

Now, calcium glucose phosphate, for example is comparatively very soluble and is said to be quite stable in the soil. As a result it will tend to diffuse widely and very deeply into the soil especially in presence of abundant rainfall. As a result, when it finally is fixed in the soil in the form of reverted phosphate there probably will be increasing numbers of the relatively insoluble particles with increasing depth in the soil and much of its actually may have washed to levels in the soil which are well below the depths to which the roots of ordinary crop plants will penetrate.

In contra-distinction to both of these types of phosphatic fertilizers, since our organic phosphates possess fairly low solubilities in the soil solution and stability toward reversion for only a few weeks, it is believed that when they are fixed finally in the soil in the reverted form there will be a considerably more uniform wide and deep punctation of the soil profile by the particles of the reverted phosphate. Under these conditions the particles of reverted phosphate will not tend to grow in size to the extent that the particles of reverted superphosphate will. It is clear that the wider and more uniform the distribution of the particles of reverted phosphate in the section of the soil profile to be occupied by the roots of crop plants the greater will be the chance of the roots and root hairs coming into contact with the particles. When contact is made utilization of the phosphorus as a plant nutrient takes place.

The salts of these organic phosphates, which upon hydrolysis yield a monohydric alcohol, vary in solubility from somewhat more soluble than monocalcium phosphate to slightly more soluble than dicalcium phosphate. They also vary in stability. As a result, we may prefer to use one compound, such as calcium ethyl phosphate, for fertilizing soil in more arid regions on account of its relatively high solubility and a compound such as a butyl or allyl phosphate in more humid regions, where the normal soil moisture is at a higher level, because the latter are considerably less soluble. However, we may under some conditions prefer to reverse this procedure. The above example is given by way of illustration, and this invention is not to be considered to be limited thereto.

When superphosphate is mixed with moist soil which is low in phosphorus content and the mixture is allowed to stand for one or two days, and then leached with an amount of water equal to the weight of the soil, very little phosphorus is removed by the water when the soil is alkaline and highly calcareous; but when the soil sample chosen is slightly acid and contains only medium amounts of calcium, iron and aluminum, more of the added phosphate is leached out by this procedure; and the amount leached out increases with increasing acidity of the soil.

On the other hand, when a small amount of one of our organic phosphates, or one of our organo-metallic phosphates, is added to the soil and the mixture allowed to stand for one or two days and then leached with an amount of water equal to the weight of the soil, any where from one-tenth to two-thirds of the phosphorus which went into the soil is to be found in the leachate depending upon which compound is used for the experiment; and the amount of phosphorus found in the leachate is much less dependent upon the pH of the soil, over a wide range of acidity and alkalinity, than in the case of superphosphate. This illustrates in another way the great difference as regards fixation between our organic phosphates and the most important commercial phosphatic fertilizer now in use.

Another important advantage of our invention is that while supplying the needed phosphorus to plants it also supplies a utilizable form of carbon. This is illustrated by an experiment in which plants were grown in soil which was treated with ethyl sulphate and compared to plants grown in the same soil containing an added amount of an inorganic sulphate which was equivalent in sulphur to that added as ethyl sulphate. The plants grown in the soil containing the ethyl sulphate were larger than those grown in the soil containing the inorganic sulphate. This shows that the ethyl part of the ethyl sulphate supplied utilizable carbon. So the carbon in this type of water-soluble mineral acid ester can be utilized indirectly by plants. Since such organic compounds as monohydric alcohols, which result finally from the hydrolysis of our organic phosphates, are utilized by the nitrogen fixing organisms in the soil, the added carbon also results in an accretion of nitrogen which ultimately is assimilated by plants.

A number of examples of fertilizing processes and products which will accomplish the desired result of supplying phosphorus to plants in a form which will penetrate into the soil and which remains available over an effective period of time will now be given. These examples are by way of illustration only, it being clearly understood that there are many possible qualitative and quantitative combinations of the compounds and/or their metallic salts which we claim as our invention and which will accomplish the desired results. It should be clearly understood that there are equivalent methods of carrying out our invention which will be obvious to those skilled in the art.

Example 1

This is an example of the form of our invention in which a relatively stable, soluble organic phosphate or combination of organic phosphates and/or combination of organo-metallic phosphates with or without admixture of organic phosphates is strewn on the land yearly in small amounts compared to the amount of superphosphate which ordinarily would be used. We may use for this purpose fifty to one hundred pounds per acre of diethyl monocalcium phosphate in the form of a powder or in water solution, for instance. This may be applied to the soil, in any one of a number of ways which are familiar to those skilled in the art, or a solution of it may be sprayed on the land, for instance, by means of insecticide spraying apparatus.

The application of our fertilizer compounds to the land is made preferably after the ground has been plowed and soon before the crop seeds are to be planted, although it should be clearly understood that it may be applied at any time and no matter what the condition of the ground. Further, it should be clearly understood that any other of the compounds or any desired mixtures thereof without regard to proportions may be used in place of diethyl monocalcium phosphate. While fifty to one hundred pounds per acre are used in this example as an excellent dosage, the amount of any of our new fertilizer materials which will be required will vary over a very wide range, depending upon the soil, the climate and the particular fertilizing material used. Therefore, we do not limit our invention to any particular amounts of the different new fertilizer materials to be used.

As an example of another fertilizing material, we may strew upon the land fifty-five pounds of tripropyl phosphate or sixty pounds of dipropyl monomagnesium phosphate per acre by any suitable means.

Example 2

This is an example of the form of our invention in which a soluble organic phosphate or combination of organic phosphates and/or combination of organo-metallic phosphates with or without admixture of organic phosphates which are relatively stable in comparison to superphosphate, when in contact with the soil solution, is applied in rows beside the plants. In agricultural fertilizer practice it is known to be advantageous to concentrate the application of the fertilizing materials, where possible by nature of the crop, by applying them a few inches to the sides of the rows. This increases the effectiveness of the fertilizer by bringing it closer to the roots in larger amounts. We may use for this purpose from forty to one hundred pounds per acre of monocalcium dimethyl phosphate, for instance, applied to the soil upon which for example soy beans are grown. The phosphatic fertilizer material is applied in rows close to the sides of the rows of plants by any appropriate means of which several are well-known. Alternatively half of the organic phosphate may be applied at the time of sowing the seeds and the other half when the plants are partly grown. Instead of using a methyl phosphate or its salt we may prefer to use mono- dipropyl or butyl phosphate or triethyl phosphate or a salt of one or more of these or a mixture of them. The amounts of materials to be used may be varied over wide limits depending upon the soil and the phosphorus requirements of the crop to be grown.

In place of the divided application of our phosphatic fertilizer materials we may prefer to obtain the same result of keeping a large amount of phosphorus highly available throughout the growing season by employing, by way of illustration, a mixture of ethyl phosphate and/or its salts with a butyl phosphate and/or its salts. The ethyl phosphates being more soluble in the soil solution will supply most of the phosphorus used by the plants during the earlier part of the growing season before the butyl phosphates have been decomposed enough to reach the point of their greatest availability. This method of fertilization extends the period of time over which the plant roots are in contact with a highly available form of phosphorus. While a 50–50 mixture of the ethyl and butyl phosphates may be used and will work well, any desired proportions may be used. In addition any other desired mixtures may be used.

Example 3

This is an example of the application to the soil of any one or more of our organic phosphates and/or organo-metallic phosphates at infrequent intervals of time. Sometimes the farmer applies superphosphate to the land every second or third year. In applying our invention to this practice we prefer to strew upon the land by any convenient means, of which several are well-known, from seventy-five to two hundred pounds per acre of, for example, diethyl phosphate, calcium diethyl phosphate, or approximately equivalent quantities of any others of our organic phosphates, and then repeat the application two years later. On a fertilizing program such as this the superiority of our phosphatic fertilizer is manifested even more clearly. Superphosphate or "ammonphos," by way of illustration, are considerably less effective the second year than they are the first year due to their fixation and crystal growth in the surface layer of the soil. On the other hand, our organic phosphates are distributed through the soil profile more or less uniformly and deeply, the crystals of the reverted phosphates which form have less tendency to grow in size with the result that under some circumstances even less phosphorus may be used in the form of the organic phosphate than in the form of superphosphate to bring about equal or greater plant growth. In comparable practice from two hundred to eight hundred pounds of superphosphate would be used every third year.

Example 4

This is an example of our invention wherein the peculiar advantages of salts of organic phosphates are utilized in actual fertilizer practice.

The uses of magnesium, potassium, iron and zinc salts of our organic phosphates will be illustrated and their advantages pointed out.

To prevent sand drown in tobacco grown in soils deficient in magnesium we may strew on the land or apply in rows beside the plants a mixture, for example, consisting of equal parts of magnesium diethyl phosphate and diethyl phosphate or calcium monomethyl phosphate, using, by way of illustration, one hundred fifty pounds of the mixture per acre. The second year the magnesium compound would be omitted, and the third year it would be included. By the use of a magnesium salt of an organic phosphate we are applying to the soil a compound all the parts of which consist of plant nutrients. No extraneous material is introduced into the soil. In addition to this, magnesium in the form of the salt of an organic phosphate will be more available to the plants than in the form in which it is usually applied to the soil. We may use magnesium salts of organic phosphates to fertilize, soils deficient in magnesium for the growth of other crops than tobacco; corn, for instance, benefits from their use in magnesium deficient soils.

Iron may be supplied to the soil, where needed, by the use of iron salts of our organic phosphates for fertilizing the land for any crop. To accomplish this an example of a mixture that we may prefer to use is forty pounds of ferrous or ferric dimethyl phosphate and sixty pounds of dipropyl or diethyl phosphate to the acre. By supplying iron to the plants in this form better distribution of this plant nutrient through the soil profile is accomplished than if it were supplied in the form of an inorganic salt of iron.

An important group of salts of our organic phosphates from the point of view of soil fertilization is the potassium salts. There are certain novel advantages in using these salts. Potassium chloride is commonly used in fertilizer practice to supply potassium to crop plants. This is wasteful in that the chloride part of the molecule is not considered to be a plant nutrient; therefore approximately half of the weight of the added fertilizer material is not utilized by the plants. In addition to this disadvantage of potassium chloride it has an acidifying effect, which is often undesirable, on the soil. If instead of potassium chloride a potassium salt of an organic phosphate is used as a fertilizer material the disadvantages of the inorganic source of potassium largely disappear because all of the elements of the potassium salt of an organic phosphate act directly or indirectly as plant nutrients and at the same time the soil is not made as permanently nor as strongly acidic as when potassium chloride is used.

To carry out this part of our invention we may employ, for example, one hundred fifty pounds per acre of potassium monoethyl phosphate. This may be strewn on the soil or used as a side dressing. Alternatively, we may use one hundred pounds per acre of potassium monobutyl phosphate applied to the soil in any convenient or economical way. Or we may use mixtures of the potassium salts of several organic phosphates to accomplish the desired results. The invention is not limited to any given salts nor combination thereof nor to any combination which may include unneutralized organic phosphates.

These illustrations of how essential plant nutrients other than phosphorus are supplied to plants by incorporating organo-metallic phosphates with the soil are given merely to show how this part of our invention can be applied in actual agricultural practice. Many ramifications of these procedures and of the compounds covered by the invention will be evident to those skilled in the art and are part of the invention.

In general, our process comprises the addition of our fertilizers to the top-soil. Rains, or other moisture, cause the fertilizer units to be washed into the soil, so that they are available not only to the roots near the surface, but also to the roots growing at a greater depth.

We claim:

1. The process of treating soil deficient in magnesium comprising the steps of applying initially approximately one hundred and fifty pounds per acre of a mixture composed of equal parts of magnesium diethyl phosphate and calcium monoethyl phosphate to the deficient soil, then applying after an elapse of one year approximately seventy five pounds per acre of the calcium monoethyl phosphate to the same soil, and then continuing to apply the mixture and the compound alternatively in this manner at yearly intervals.

2. The process of treating soil deficient in magnesium comprising the steps of applying initially approximately one hundred and fifty pounds per acre of a mixture composed of equal parts of magnesium diethyl phosphate and diethyl phosphate to the deficient soil, then applying after an elapse of one year approximately seventy five pounds per acre of the diethyl phosphate to the same soil, and then continuing to apply the mixture and the compound alternatively in this manner at yearly intervals.

WILDER D. BANCROFT.
JAMES K. WILSON.
JOHN E. RUTZLER, Jr.